(12) United States Patent
Christopher et al.

(10) Patent No.: US 12,661,733 B2
(45) Date of Patent: Jun. 23, 2026

---

(54) WELDING SYSTEM WITH SUPPORT BASE

(71) Applicant: Illinois Tool Works Inc., Glenview, IL (US)

(72) Inventors: Mark Christopher, Neenah, WI (US); Adam Richard Schmitz, Neenah, WI (US); Connor Denis Uitenbroek, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1035 days.

(21) Appl. No.: 17/733,001

(22) Filed: Apr. 29, 2022

(65) Prior Publication Data

US 2022/0347783 A1 Nov. 3, 2022

Related U.S. Application Data

(60) Provisional application No. 63/182,535, filed on Apr. 30, 2021.

(51) Int. Cl.
| | |
|---|---|
| *B23K 9/12* | (2006.01) |
| *B23K 9/133* | (2006.01) |
| *B23K 37/02* | (2006.01) |

(52) U.S. Cl.
CPC ............ *B23K 9/125* (2013.01); *B23K 9/1333* (2013.01); *B23K 9/1336* (2013.01); *B23K 37/0294* (2013.01)

(58) Field of Classification Search
CPC ...... B23K 37/02–0235; B23K 37/0294; B23K 37/0282; B23K 37/0288; B23K 37/0205;
(Continued)

(56) References Cited

U.S. PATENT DOCUMENTS 7,448,632 B1 11/2008 Nieto
2003/0098383 A1* 5/2003 Luo ...................... B23K 9/1333
242/564.3
(Continued)

FOREIGN PATENT DOCUMENTS

CN 110732815 1/2020
DE 29903200 8/1999
(Continued)

OTHER PUBLICATIONS

Webster's definition of "bracket" (Year: 2025).*
European Office Communication with extended Search Report
AppIn No. 22171057.7 dated Oct. 20, 2022.

*Primary Examiner* — Helena Kosanovic
*Assistant Examiner* — Bonita Khlok
(74) *Attorney, Agent, or Firm* — McAndrews, Held & Malloy, Ltd.

(57) ABSTRACT

An example wire feeder includes: a wire supply support configured to supply welding wire; a wire drive assembly configured to feed wire to a welding gun from the wire supply support; a support base defining a lower surface, the wire supply support and the wire drive assembly supported by the support base, the support base being pivotable from an operational position to a travel position; a handle at a first end of the support base; and at least one reduced friction element extending from a second end of the support base so that the support base is in contact with a support surface when the support base is in the operational position, and the reduced friction element is in engagement with the support surface and the support base is out of contact with the support surface when the support base is pivoted to the travel position.

19 Claims, 11 Drawing Sheets

(58) Field of Classification Search
CPC ...... B23K 9/125; B23K 9/133; B23K 9/1333;
B23K 9/1336; B23K 9/327; B65H 49/38;
B62B 5/0083; B62B 1/008
USPC ............................... 219/137.2–137.31, 137.7
See application file for complete search history.

(56) References Cited

U.S. PATENT DOCUMENTS

| | | | |
|---|---|---|---|
| 2004/0140638 A1 | 7/2004 | Celli | |
| 2018/0079347 A1* | 3/2018 | Ellis | B60P 1/6454 |

FOREIGN PATENT DOCUMENTS

| | | |
|---|---|---|
| WO | 2007145699 | 12/2007 |
| WO | 2010030367 | 3/2010 |
| WO | 2015178983 | 11/2015 |

* cited by examiner

WELDING SYSTEM WITH SUPPORT BASE

RELATED APPLICATIONS

The present application claims the benefit of U.S. Provisional Patent Application Ser. No. 63/182,535, filed Apr. 30, 2021, entitled "WELDING SYSTEM WITH SUPPORT BASE." The entirety of U.S. Provisional Patent Application Ser. No. 63/182,535 is expressly incorporated herein by reference.

FIELD OF THE DISCLOSURE

The present disclosure relates generally to welding systems and, more particularly, to a wire feeder with an adjustable lift point.

BACKGROUND

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control.

A wire feeder is operationally connected to the power source and is designed to deliver consumable wire to a weld. Often times, it is desirable that a welding system, including any wire feeder, be portable to support various welding operations outside of a shop or plant setting. The system may be required to undergo movement from multiple locations in any given day. In general, some welding feeders have been supplied with a fixed base plate or an accessory option of being placed on a cart with a power source. The systems may have a relatively great mass which, combined with their configuration, present difficulties to operators while transporting the system around a job site, as they are often difficult to move. Improved systems are desirable.

SUMMARY

Disclosed example welding systems include a wire feeder, comprising a wire supply support configured to supply welding wire, a wire drive assembly configured to feed wire to a welding gun from the wire supply support, a support base defining a lower surface, the wire supply support and the wire drive assembly supported by the support base, the support base being pivotable from a horizontal position to an angled position, a handle at a first end of the support base, and at least one reduced friction element extending from a second end of the support base and spaced from the lower surface of the support base so that the reduced friction element is out of engagement with a support surface when the support base is in the horizontal position and the reduced friction element is in engagement with the support surface when the support base is pivoted to an angled position.

In examples, the reduced friction element is at least on caster. In other examples, the reduced friction element comprise at least two casters. In certain of such examples, the wire feeder further comprises a caster support bracket extending from the support base that spaces the caster from the lower surface of the support base.

In examples, the wire feeder comprises at least two casters extending from the second end of the support base and spaced from the lower surface of the support base so that the caster is out of engagement with the support surface when the support base is in the horizontal position and the caster is in engagement with the support surface when the support base is pivoted to an angled position.

The wire feeder in examples also comprises a support stand extending from the second end of the support base. In some examples, the support base is pivotable to an upright position, and the support stand extends laterally from the support base and is configured to support the wire feeder in the upright position.

In examples, the caster is out of engagement with the support surface when the support surface is pivoted to the upright position. In other examples, the support stand comprises a plate.

The wire feeder in some examples further comprises at least one rail extending from the bottom of the support base, the at least one rail defining the lower surface of the support base and configured to support the wire feeder when the support base is in the horizontal position.

The wire feeder in other examples has a support base that is pivotable from the horizontal position to plural angled positions including a first angled position in which the caster and the lower surface of the support base are in engagement with the support surface, and a second angled position in which the caster is in engagement with the support surface and the lower surface of the support base is out of engagement with the support surface.

The wire feeder in yet further examples includes a support base that pivotable from the horizontal position to plural angled positions including a first angled position in which the caster and the lower surface of the support base are in engagement with the support surface, a second angled position in which the caster is in engagement with the support surface and the lower surface of the support base is out of engagement with the support surface, and a third angled position in which the wire feeder is upright and the support stand is in engagement with the support surface.

In examples, a sled for a wire feeder, comprises a support plate defining a lower surface, the wire supply support and the wire drive assembly supported by the support plate, the support plate being pivotable from a horizontal position to an angled position, a handle at a first end of the support plate, at least one caster extending from a second end of the support plate and spaced from the lower surface of the support plate so that the caster is out of engagement with a support surface when the support plate is in the horizontal position and the caster is in engagement with the support surface when the support plate is pivoted to an angled position.

In examples the sled further comprises a caster support bracket extending from the support plate that spaces the caster from the lower surface of the support plate.

In some examples, the sled comprises at least two casters extending from the second end of the support plate and spaced from the lower surface of the support plate so that the caster is out of engagement with the support surface when the support plate is in the horizontal position and the caster is in engagement with the support surface when the support plate is pivoted to an angled position.

The sled further comprises, in examples, a support stand extending from the second end of the support plate.

In some examples, the sled includes a support plate that is pivotable to an upright position, and the support stand extends laterally from the support plate and is configured to support the wire feeder in the upright position.

In examples, the caster is out of engagement with the support surface when the support surface is pivoted to the upright position.

The sled in examples has a support stand that comprises a plate. In examples, at least one rail extends from the bottom of the support plate, and the at least one rail defines the lower surface of the support plate and configured to support the wire feeder when the support plate is in the horizontal position.

The sled in examples has a support plate that is pivotable from the horizontal position to plural angled positions including a first angled position in which the caster and the lower surface of the support plate are in engagement with the support surface, and a second angled position in which the caster is in engagement with the support surface and the lower surface of the support plate is out of engagement with the support surface.

The sled in yet further examples has a support plate that is pivotable from the horizontal position to plural angled positions including a first angled position in which the caster and the lower surface of the support plate are in engagement with the support surface, a second angled position in which the caster is in engagement with the support surface and the lower surface of the support plate is out of engagement with the support surface, and a third angled position in which the wire feeder is upright and the support stand is in engagement with the support surface.

In other examples, a wire feeder includes: a wire supply support configured to supply welding wire; a wire drive assembly configured to feed wire to a welding gun from the wire supply support; a support base defining a lower surface, the wire supply support and the wire drive assembly supported by the support base, the support base being pivotable from an operational position to a travel position; a handle at a first end of the support base; and at least one reduced friction element extending from a second end of the support base so that the support base is in contact with a support surface when the support base is in the operational position, and the reduced friction element is in engagement with the support surface and the support base is out of contact with the support surface when the support base is pivoted to the travel position.

In some examples, the at least one reduced friction element includes at least one caster, and the wire feeder further includes a caster support bracket extending from the support base that spaces the at least one caster from the lower surface of the support base.

In some examples, the at least one reduced friction element includes at least two casters extending from the second end of the support base and spaced from the lower surface of the support base so that the casters are out of engagement with the support surface when the support base is in the operational position and the casters are in engagement with the support surface when the support base is pivoted to the travel position.

Some example wire feeders further include a support stand extending from the second end of the support base. In some examples, the support base is pivotable to a stored position, and the support stand is configured to support the wire feeder in the stored position. In some examples, the reduced friction element is out of engagement with the support surface when the wire feeder is pivoted to the stored position. In some examples, the support stand includes a plate. In some examples, the stored position is an upright position.

Some example wire feeders further include at least one rail extending from the bottom of the support base, in which the at least one rail defines the lower surface of the support base and is configured to support the wire feeder when the support base is in the operational position. In some examples, the support base is pivotable from the operational position to plural travel positions including a first angled position in which the reduced friction element and the lower surface of the support base are in engagement with the support surface, and a second angled position in which the reduced friction element is in engagement with the support surface and the lower surface of the support base is out of engagement with the support surface.

In some examples, the at least one reduced friction element is out of engagement with the support surface when the support base is in the operational position. In some examples, the at least one reduced friction element includes at least one of a wheel, a sliding pad, a caster, a roller, or a bearing. In some examples, the operational position is a horizontal position, and the travel position is an angled position.

In other examples, a sled, for a wire feeder including a wire supply support configured to supply welding wire and a drive assembly configured to feed wire to a welding gun from the wire supply support, includes: a support plate defining a lower surface and configured to support the wire supply support and the wire drive assembly, the support plate being pivotable from a horizontal position to an angled position; and at least one reduced friction element extending from a second end of the support base so that the support base is in contact with a support surface when the support base is in the operational position, and the reduced friction element is in engagement with the support surface and the support base is out of contact with the support surface when the support base is pivoted to the travel position.

Some example sleds further include a support bracket extending from the support plate that spaces the reduced friction element from the lower surface of the support plate. In some examples, the at least one reduced friction element includes at least two casters extending from the second end of the support plate and spaced from the lower surface of the support plate so that the casters are out of engagement with the support surface when the support plate is in the operational position and the casters are in engagement with the support surface when the support plate is pivoted to a travel position.

Some example sleds further include a support stand extending from the second end of the support plate. In some examples, the support plate is pivotable to an upright storage position, and the support stand extends from the support plate and is configured to support the wire feeder in the upright storage position. In some examples, the support plate is pivotable from the operational position to plural travel positions including a first angled position in which the caster and the lower surface of the support plate are in engagement with the support surface, and a second angled position in which the caster is in engagement with the support surface and the lower surface of the support plate is out of engagement with the support surface.

Some other example wire feeders include: a wire supply support configured to supply welding wire; a wire drive assembly configured to feed wire to a welding gun from the wire supply support; a support base defining a lower surface, the wire supply support and the wire drive assembly supported by the support base, the support base being pivotable from an operational position to a travel position; and at least one reduced friction element coupled to the support base, so that the support base is in contact with a support surface when the support base is in the operational position, and the reduced friction element is in engagement with the support surface and the support base is out of contact with the support surface when the support base is pivoted to the travel position.

BRIEF DESCRIPTION OF THE DRAWINGS

The figures are not necessarily to scale. Wherever appropriate, similar or identical reference numerals are used to refer to similar or identical components.

DETAILED DESCRIPTION

Figure 1:
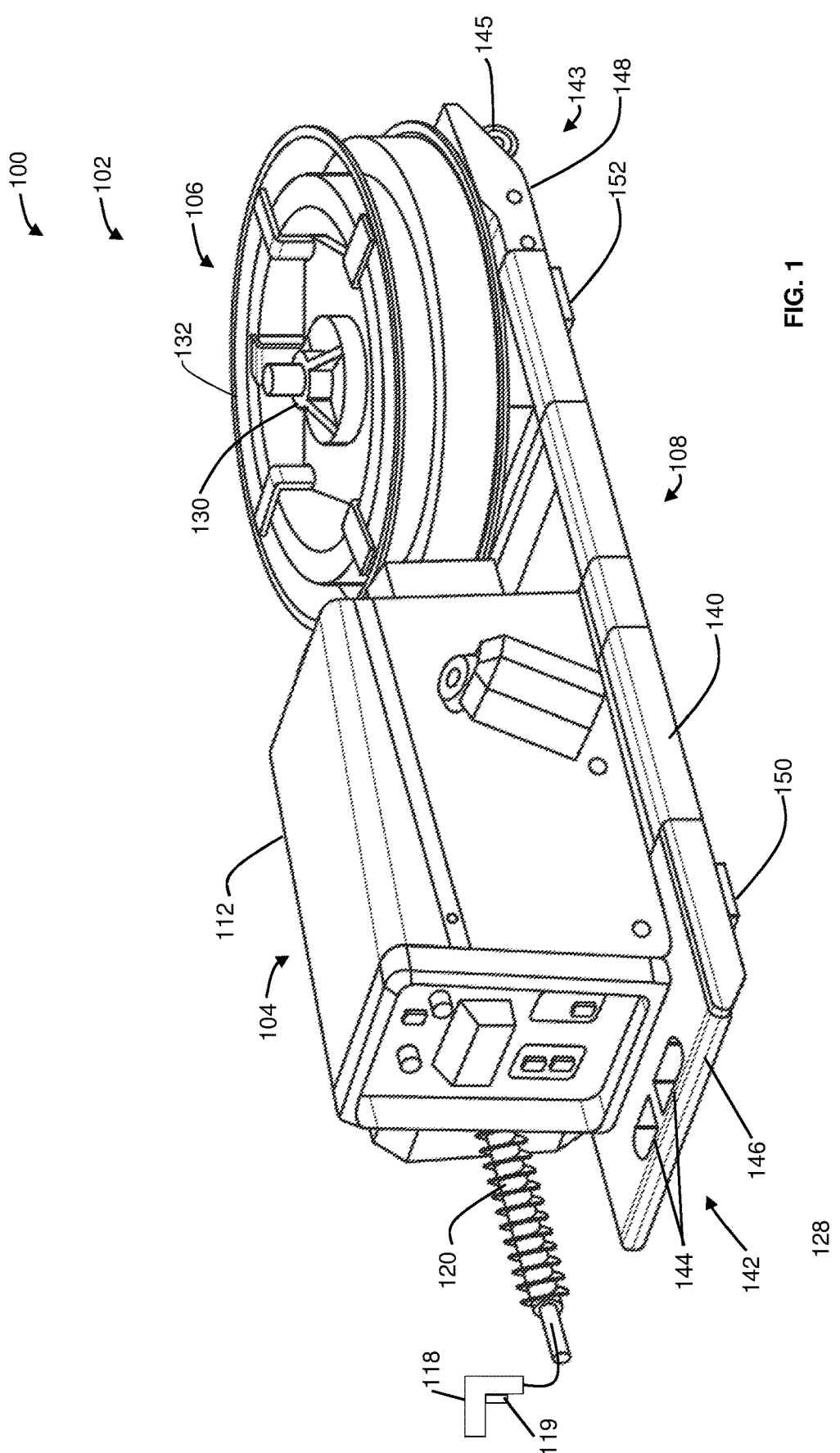
FIG. 1 is a perspective view of an example a welding system having a support base, in accordance with aspects of this disclosure.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments" does not require that all disclosed embodiments include the discussed feature, advantage, or mode of operation.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z),$ $(y, z), (x, y, z)\}$. In other words, "x, y and/or z" means "one or more of x, y and z". As utilized herein, the term "exemplary" means serving as a non-limiting example, instance, or illustration.

The present disclosure will be described with respect to a welding system with a dolly including a wire feeder of a MIG welding system. However, the present disclosure is applicable to power sources and various welding systems, for example, power sources for TIG, stick, flux cored, and the like welding systems. Moreover, the present disclosure is also applicable to supports for non-welding, high power systems such as plasma cutters and induction heaters, and other mechanical systems and components (including non-welding related systems) that may be positioned on a support structure such as a dolly.

Referring to FIGS. 1-4, a welding system 100 includes a wire feeder 102 with a drive assembly 104 and a wire supply support 106, and a support base 108. The drive assembly 104 of the wire feeder 102 includes rollers or gears (not shown) to advance consumable welding wire from the wire supply support 106 to a welding torch or gun. In the embodiment shown, the drive assembly 104 is protected by a housing 112. In other embodiments, additional components of the wire feeder may be positioned in a housing such as housing 112. For example, the wire supply support may be positioned in a housing with the drive assembly (e.g., a briefcase wire feeder).

Power is supplied to the wire feeder 102 by a welding power source (not shown) through a weld cable (not shown). The power source is designed to run in various modes, such as voltage-controlled, or current-controlled, and is further configured to power other welding systems and to provide auxiliary power to various accessories. The power source is designed to condition raw power supplied from a utility line or engine driven power supply and output power usable by the welding process. The output of the power source is generally controlled by a controller and associated operational circuitry that regulates the secondary or output side of the power conditioning components. A gas supply line (not shown) connects the wire feeder to a gas source or cylinder to provide shield gas for welding operations.

A welding gun or torch 118 connects to the wire feeder 102 via a wire guide line 120. The gun 118 is configured to supply consumable welding wire to a workpiece. Control signals are transmitted between the torch 118 and the wire feeder 102 via a control line (not shown). Torch 118 is equipped with a trigger 119 that, when depressed, causes a transceiver of a controller (not shown) in the housing 112 of the wire feeder 102 to transmit control signals to the power source through weld cable.

The wire supply support 106 in the example of FIGS. 1-4 includes a reel or a hub 130 that rotatably supports a spool 132 of welding wire (welding wire not shown). Wire is drawn from the spool 132 by the drive assembly 104. The spool 132 rotates to allow additional wire to be unwound from the spool as the wire is drawn through the drive assembly 104. While a spool of wire is depicted, other sources of wire may be utilized by wire feeder 102, for example, a free spool, a container or box with spooled wire, or any other desirable source of welding wire usable by a drive assembly. Additionally or alternatively, the hub 130 and the spool 132 may have a different orientation with respect to the plate 140, and/or the orientation and/or position of the hub 130 and the spool 132 may be adjustable.

The drive assembly 104 and wire supply support 106 are supported by a sled or support base 108. The support base 108 rigidly connects the drive assembly and the wire supply support together to ensure proper orientation to perform a welding operation, and to allow the feeder to be transported. In the embodiment depicted, the drive assembly 104 and the wire supply support 106 are supported on a support plate 140 of the support base 108. The drive assembly and wire supply in the embodiment shown are mounted to the plate, for example, bolted to the plate, welded to the plate, or the like. The sled or support base 108 further includes a handle or lift member 142, a pair of rails 150, 152, and a caster assembly 143 with a pair of casters 145 (one shown in FIGS. 1-4).

The handle or lift member 142 facilitates the lifting and transportation of the wire feeder 102, and includes a leading edge 146 and one or more openings 144 to facilitate grasping by the hand of a user. The leading edge 146 is shaped so that a user may readily grasp the edge with their hands to facilitate lifting, pulling, pushing, and other manipulation of the support base 108, as described further herein. In examples, the leading edge 146, the one or more openings 144, or both, function as a handle for an operator. Each opening 144 in the embodiment shown is ergonomically sized and shaped to receive a portion of the user's hands and fingers so that the support base can be pulled, lifted, pushed, and otherwise moved. In embodiments, the one or more openings also provide a point of attachment for a crane, gantry, or other suitable lifting device (not shown).

Figure 2:
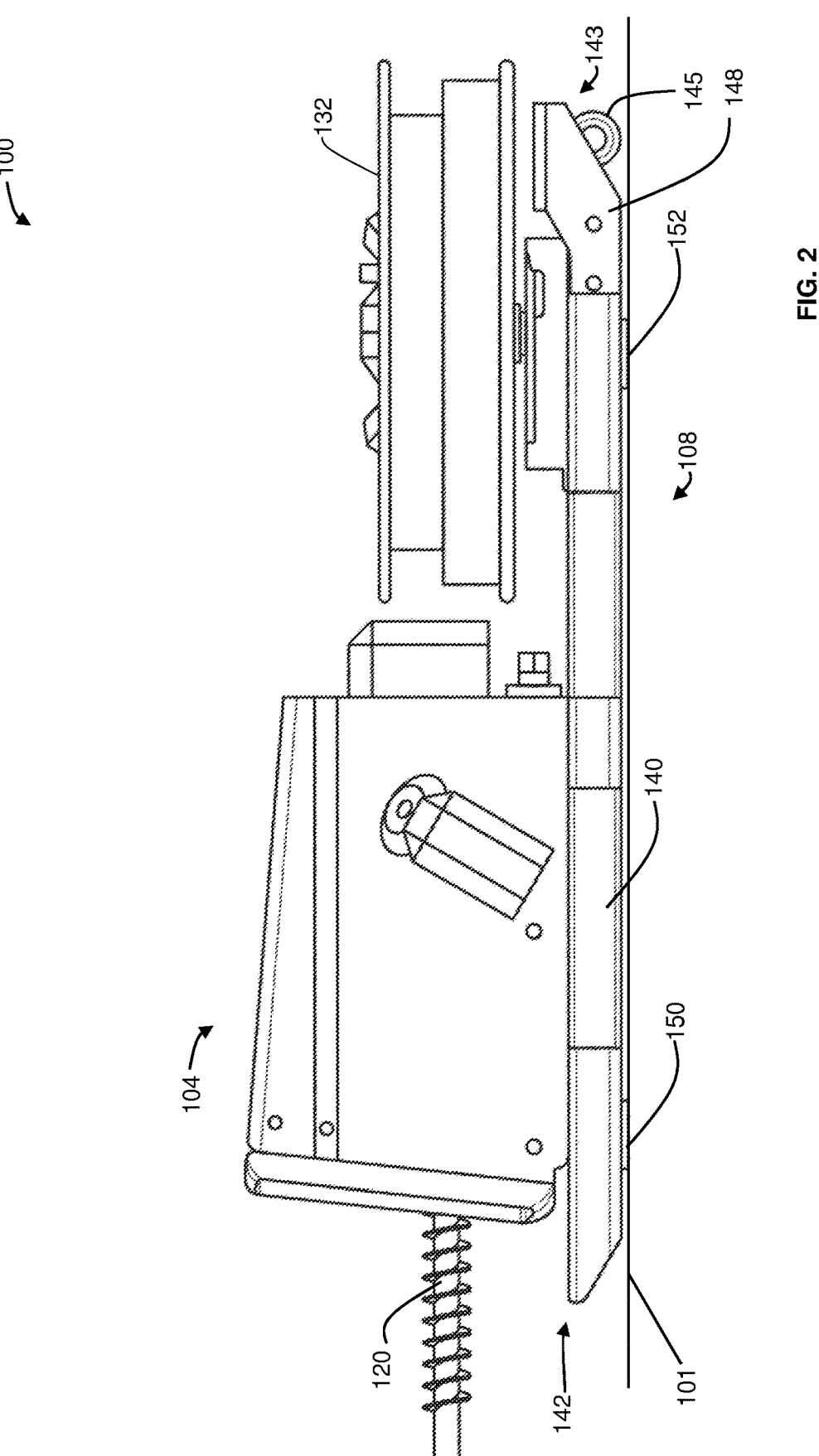
FIG. 2 is a side view of the welding system of FIG. 1 in a horizontal operational position.

The rails 150, 152 in the embodiment depicted extend from the bottom of the support plate 140 and space the welding system 100 from the ground. With reference to FIG. 2, the system is in a static, horizontal operational position with the lower surfaces of rails 150, 152 in contact with a support surface 101 defining a ground plane.

An "operational position" refers to positions of the welding system in which the operator uses the equipment. Typical operational positions are static such that the operator may expect that the system will not move during welding or other use of the equipment. In typical operating conditions, the wire feeder 102 is upright and in proper orientation for welding while in a static, horizontal position. Rails 150, 152 (which may also be referred to as feet) are attached to the support plate 140 independently of one another, and provide a sliding surface to move the system across a surface over short distances when the welding system 100 is in a horizontal position. An operator may slide the system 100 along the ground on the rails 150, 152 while in an operational position, particularly over short distances. In some embodiments, the bottom surface of the rails 150, 152 provides a lower friction surface to drag or push the system along the ground. In embodiments, the rails 150, 152 are positioned with respect to the components of the wire feeder 102 to provide a relatively even mass distribution across the bottom surfaces of the rails 150, 152, which also facilitates sliding or dragging the system when needed, particularly over short distances. While system 100 includes rails 150, 152, in embodiments, sled or support surface 108 rests directly on the ground and the rails are omitted. In such embodiments, a user may also move the welding system 100 over short distances by sliding the system with the bottom surface of the support plate 140 in contact with the ground or other support surface.

The caster assembly 143 includes a bracket 148 that extends from the support plate 140. With reference to FIG. 2, the casters 145 are elevated above the support surface 101, such as the ground, when the welding system 100 is in the horizontal position. In embodiments, the rails 150, 152, the support plate 140, the bracket 148, any combination, or another structure, ensure that the casters 145 are spaced from the support surface 101 when the welding system 100 is in a horizontal position. In other examples, the casters 145 may be in contact with the support surface 101 in the horizontal position, under no load, negligible load, or substantial load. Whether the casters 145 are spaced from the support surface 101 or in contact with the support surface 101, contact between the support plate 108 and the support surface 101 resists movement of the welding system 100.

While casters are depicted in the embodiment of welding system 100, any desired reduced friction element or reduced friction elements may be implemented. For example, the reduced friction element may include wheels, bearings, a surface with a reduced friction coefficient (e.g., a sliding pad), rollers, and so forth.

In operation, welding system 100 is typically oriented horizontally to facilitate welding operations at a work site, for example, while on the ground, on a floor, a concrete slab, in the bed of a truck, on a stand, or the like, as best shown in FIGS. 1-2. In the horizontal operational position, the wire feeder 102 of welding system 100 is upright and in proper orientation for welding. An operator may slide, push, or drag the system 100 along the ground or other support surface on the rails 150, 152 in the horizontal position. For example, the user may push or pull the system along the rails 150, 152 to make small positional adjustments and to orient the system as is desired. Due to the relatively high mass of welding systems, it may only be practical for the user to move welding system 100 in short "bursts" or distances on the rails.

Figure 3:
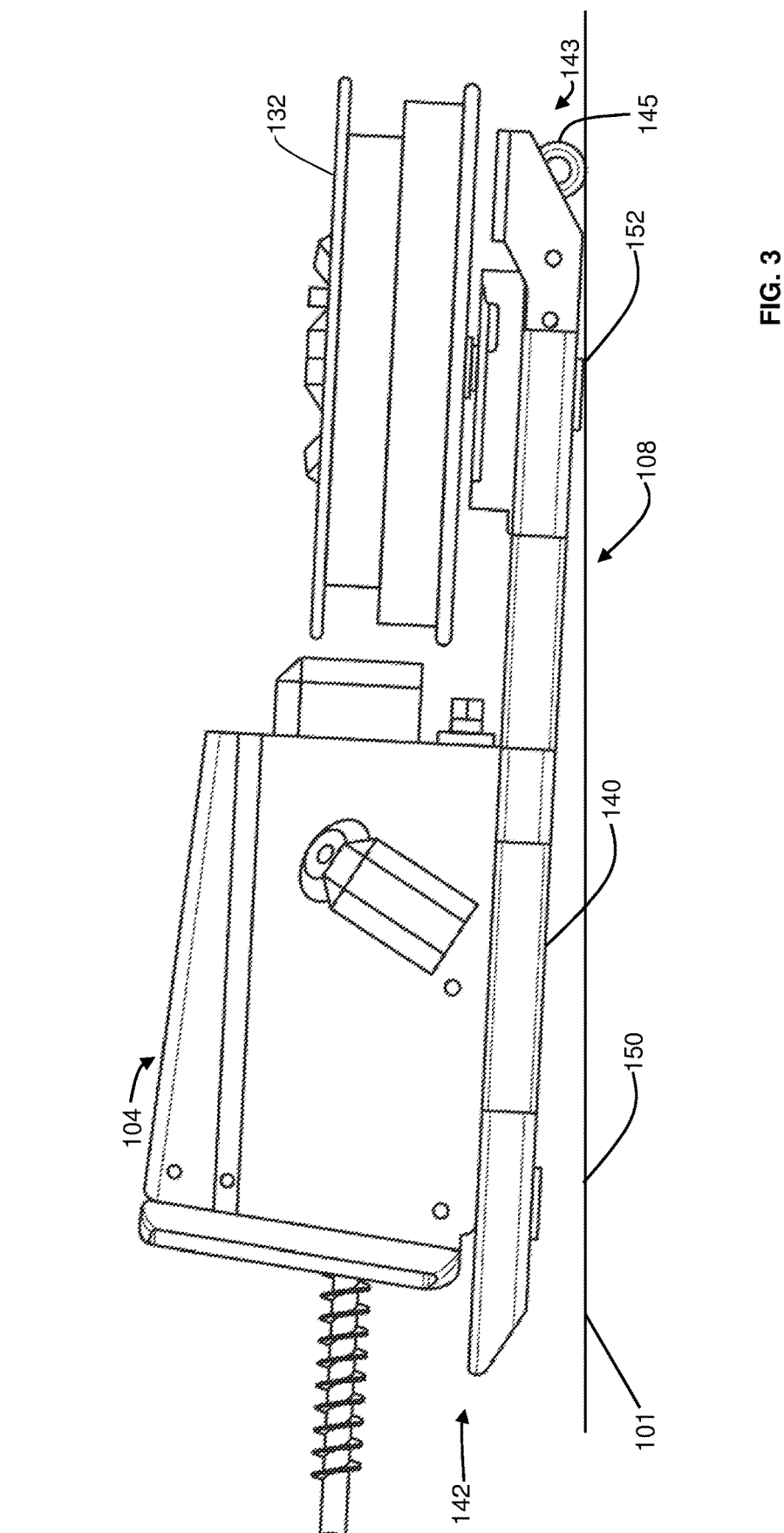
FIG. 3 is a side view of the welding system of FIG. 1 in an angled travel position.

The welding system 100 may also be moved on casters 145 over short or long distances by pivoting the welding system 100 into an angled travel position (e.g., onto the casters 145). The user may pull up on the handle or lift member 142, causing the welding system 100 to pivot from the horizontal operational position (FIG. 2) to an angled travel position in which the casters 145 begin to engage the support surface 101 (FIG. 3) and the support base 108 is completely or nearly completely out of contact with the support surface 101. In FIG. 3, welding system is at a relatively low angle, and because the casters 145 have begun to engage the support surface 101, quick adjustments to the feeder's location can be made in the immediate workspace. In this position, at least some of the weight of the welding system rests on the casters 145, allowing the user to move the system.

Figure 4:
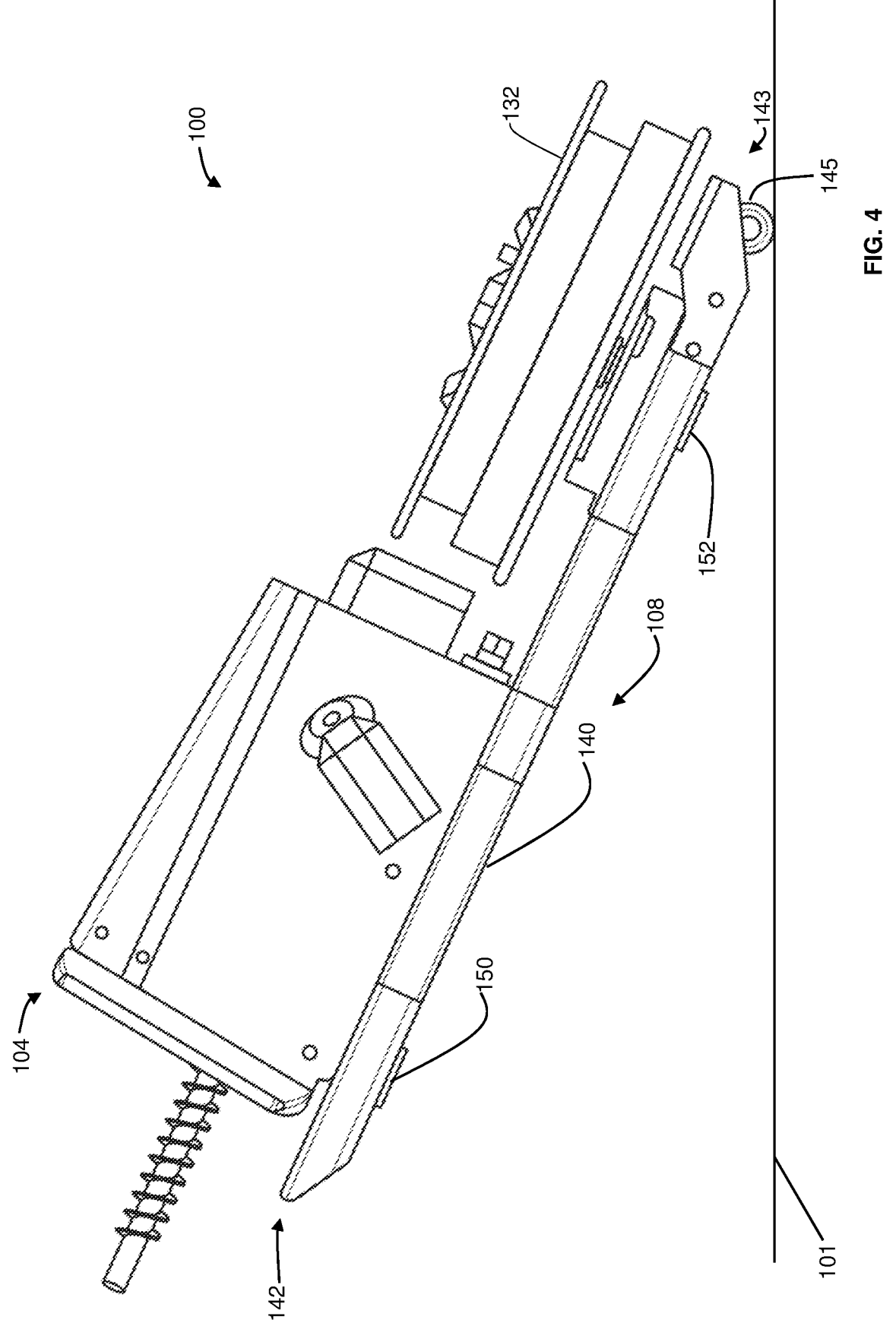
FIG. 4 is a side view of the welding system of FIG. 1 in another angled travel position.

The welding system 100 may be further pivoted by pulling up on the handle (FIG. 4). As the angle increases, a greater portion of the weight of the welding system is shifted to the casters (in some cases, much or all of the weight, depending on the specific angle to which the user pivots the system). The welding system 100 may then be pulled or pushed by handle or lift member 142 to move welding system along the ground or other support surface 101 with the assistance of the casters 145. The amount of weight supported by the user's hand and the amount of weight supported by the casters may be adjusted by adjusting the angle at which the user pivots the welding system 100. For example, pivoting the welding system 100 from the horizontal position to a relatively smaller angle will result in a relatively higher amount of weight on the user's hand, while pivoting the welding system 100 to a greater angle from horizontal will result in an increased amount of weight shifting to the casters 145, and less weight for the user to support via the handle or lift member 142. After moving the welding system 100 to a desired location, a user may lower the handle or lift member 142 to the ground or support surface 101, causing the system 100 to pivot from the angled, transport position back to a horizontal or operating position with the casters 145 out of contact with the support surface (FIG. 2). Additional welding operations may then commence.

Figure 5:
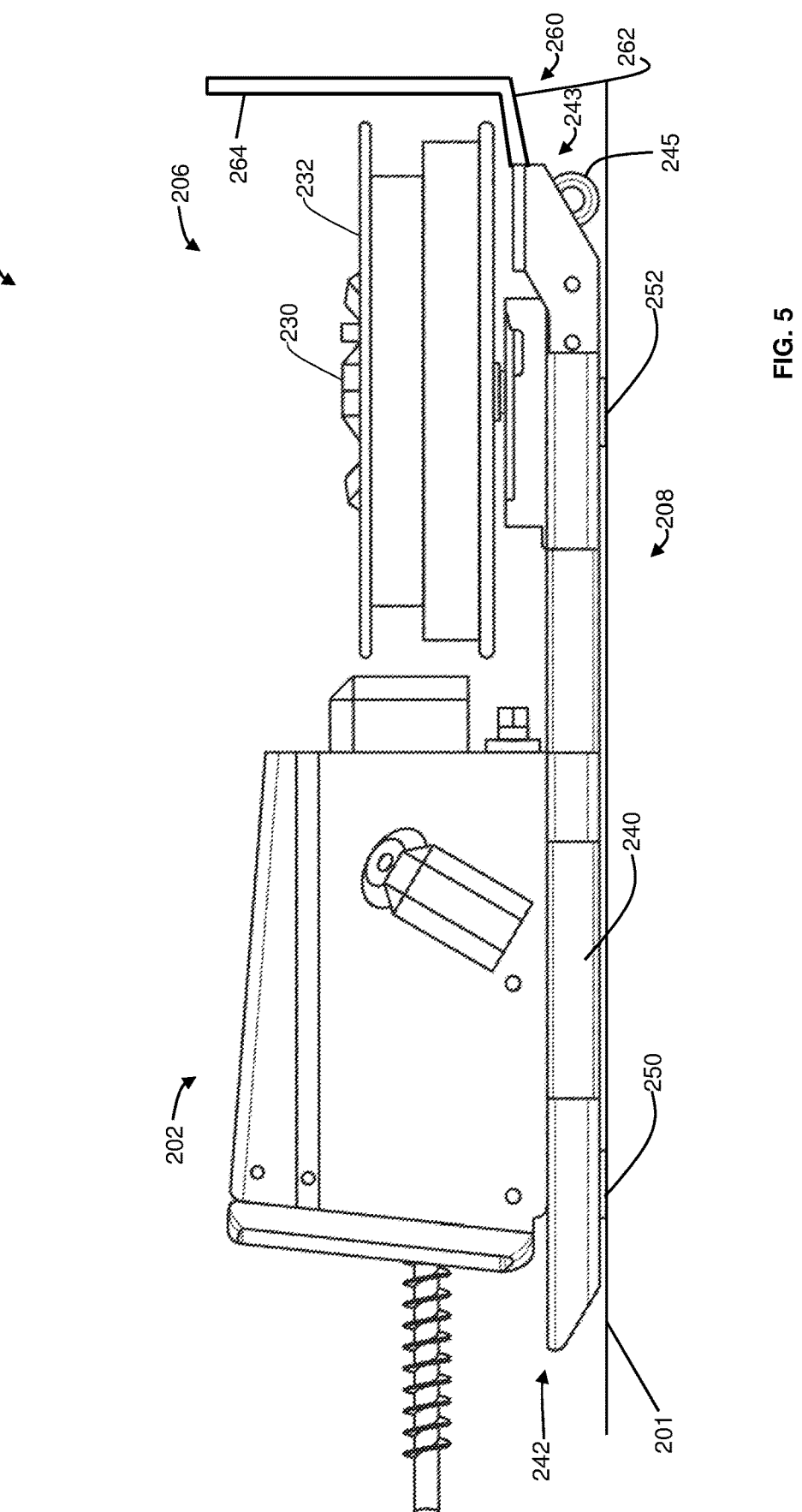
FIG. 5 is a side view of another example welding system having a support base in a horizontal operational position, in accordance with aspects of this disclosure.
Figure 6:
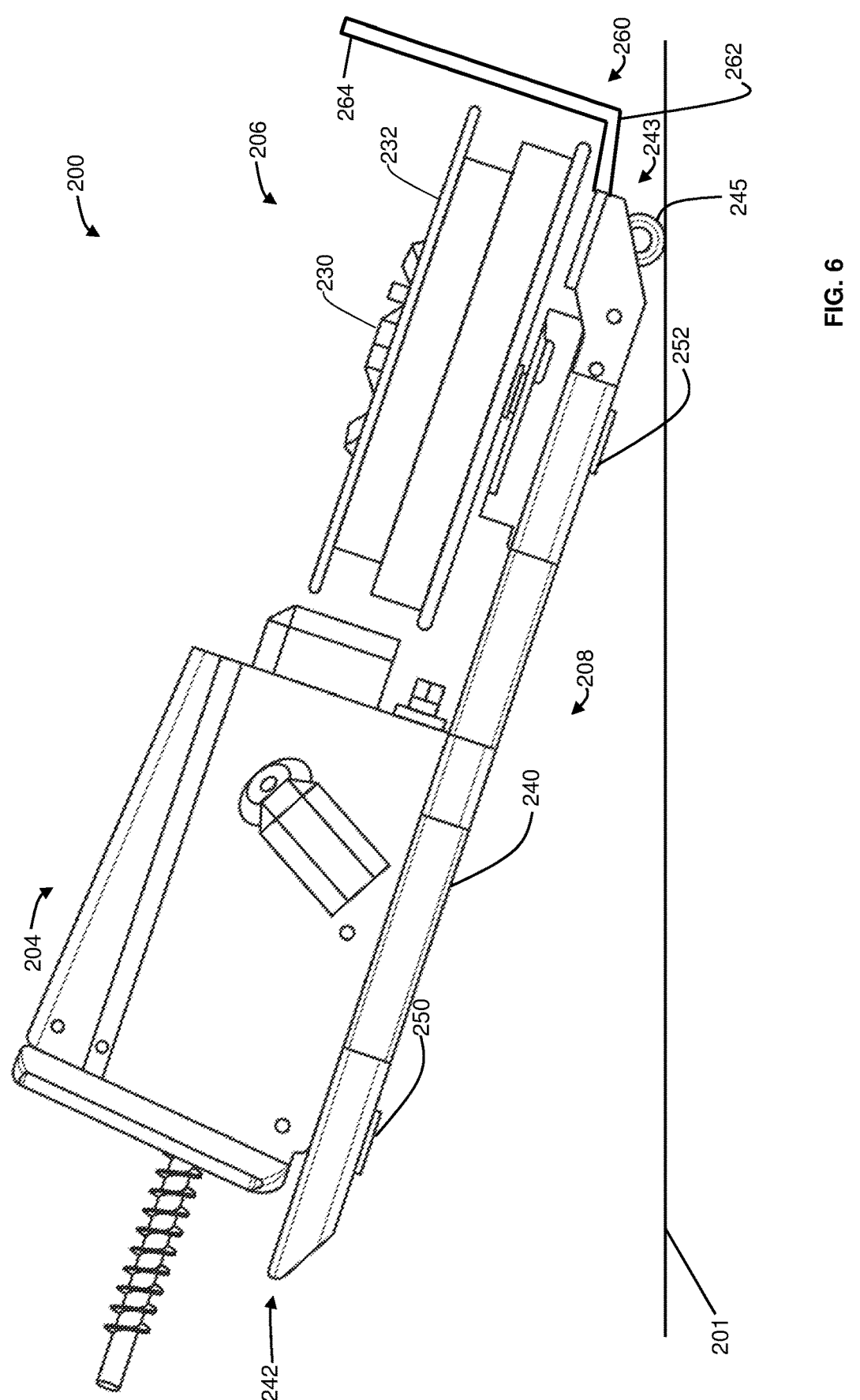
FIG. 6 is a side view of the welding system of FIG. 5 in an angled travel position.
Figure 7:
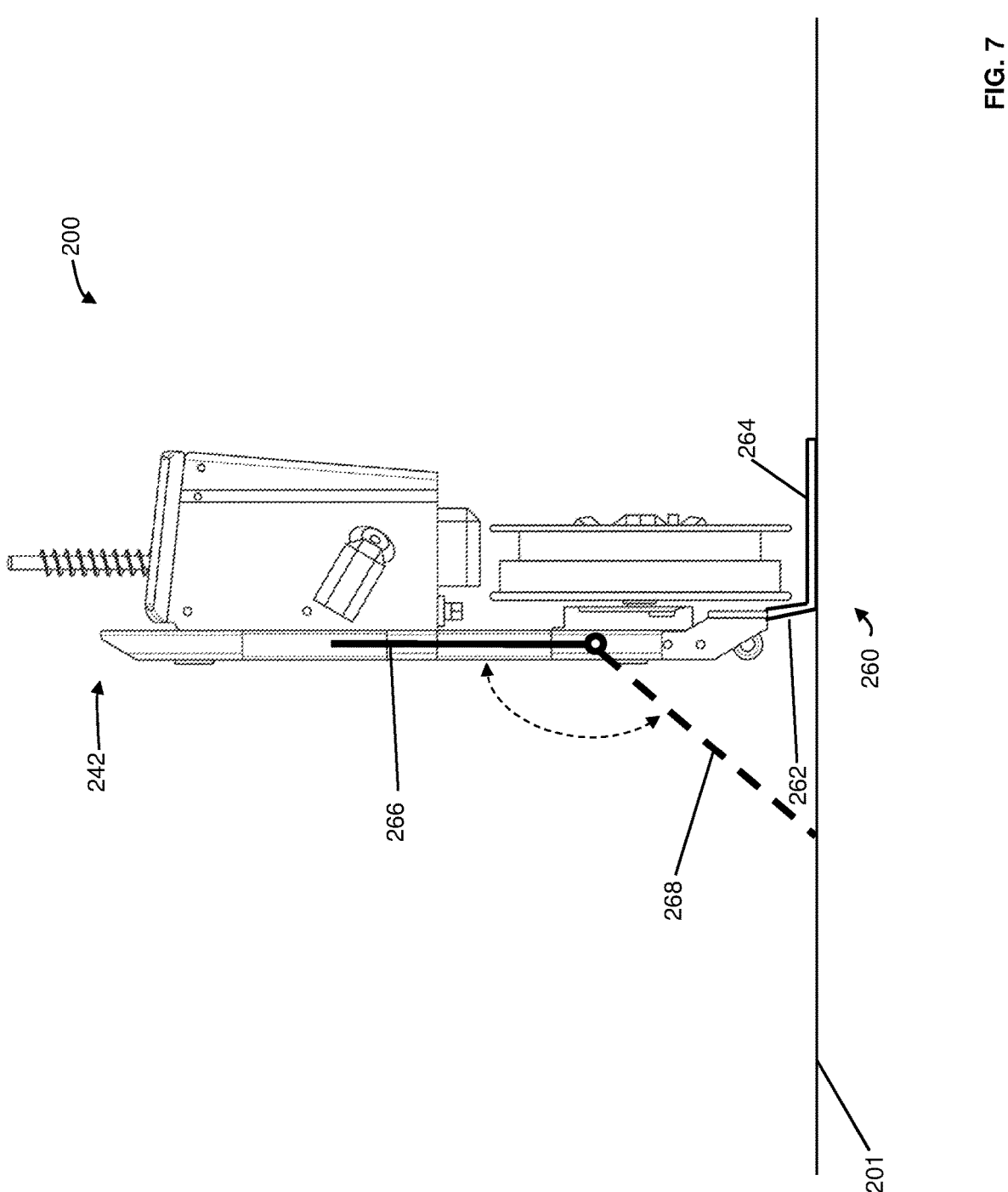
FIG. 7 is a side view of the welding system of FIG. 5 in another angled travel position.

Turning to FIGS. 5-7, a welding system 200 includes a wire feeder 202 with a drive assembly 204 and a wire supply support 206 with a reel or a hub 230 that rotatably supports a spool 232 of welding wire, and a support base 208 with a support plate 240. Welding system 200 further includes a handle or lift member 242, rails 250, 252, and a caster assembly 243 with casters 245. Welding system 200 may be moved on rails 250, 252 or on casters 245.

Welding system 200 further includes a support stand 260 to allow positioning of the welding system 200 in a vertical storage position during storage. Support stand 260 includes an extension bracket 262 and a support member 264. The support member 264 in the embodiment depicted is a plate that ensures the welding system 200 remains secure and balanced when in a vertical position. In embodiments, the support member 264 extends laterally from the base plate a distance sufficiently past the center of gravity of the welding system when in the upright position. As such, the support stand 260 can maintain the welding system 200 in an upright position even if acted on by outside forces (e.g., wind, a worker bumping into the unit, and etc.). The support stand 260 also provides physical protection to the spool as it extends over and covers at least a portion of the spool. Other structures are possible, for example, support bars or beams, cross bars or beams, support rods, kickstands, one or more plates, combinations of the same, and other structures that enable the welding system 200 to remain upright. Additionally, an opposing kickstand 266 may be attached to the support base 108 to resist or prevent the welding system 200 from tipping over when extended (e.g., rotated) to a support position 268.

In operation, welding system 200 is oriented horizontally to facilitate welding operations at a work site. (FIG. 5). An operator may slide, push, or drag the system 100 along the ground or other support surface on the rails 250, 252. The welding system 200 may also be moved on casters 245 over short or long distances by first lifting the handle or lift member 242, causing the welding system 200 to pivot from a horizontal position (FIG. 5) to an angled position with the casters 245 in engagement with the ground or support surface (FIG. 6). The welding system 200 may then be pulled or pushed by handle or lift member 242 to move welding system along the ground or other support surface 201 with the assistance of the casters 245.

Welding system 200 may be further pivoted to an upright, storage, or vertical position on the support stand 260 (FIG. 7). In this embodiment, the welding system has a compact footprint in the upright position and the welding system is well balanced. The spool is also protected in the upright position. For example, when in the upright position, the support plate extends over the spool. The welding system may also be positioned in the upright position with the spool facing another structure such as a truck, wall or other equipment, to provide added protection to the spool. The user may selectively grasp the handle or lift member 242 when desired and tip or pivot the system back to an angled or horizontal position when the user desires to move the system and perform another welding operation.

Figure 8:
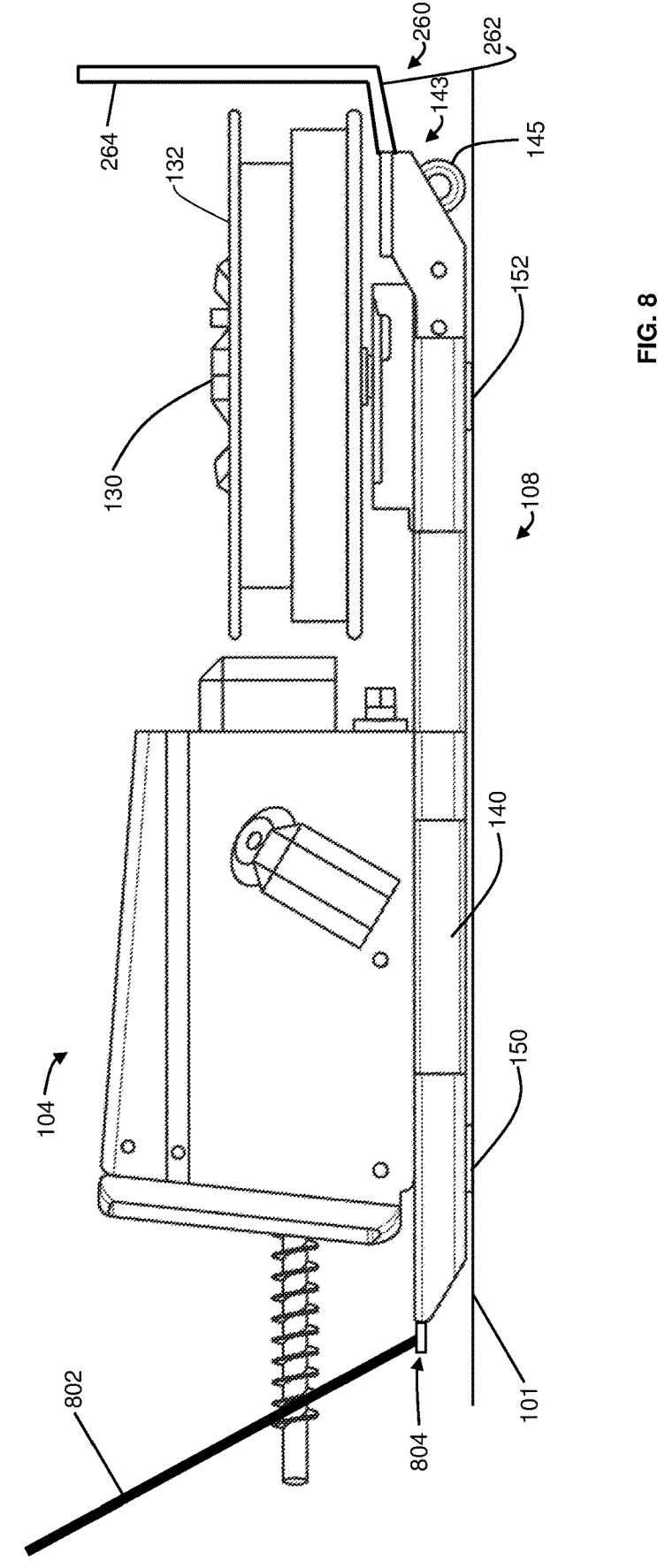
FIG. 8 is a side view of another example of the welding system of FIG. 1 in a horizontal operational position and having a harness.

FIG. 8 is a side view of another example welding system 800 in a horizontal position. The example welding system 800 includes the drive assembly 104, the support base 108, the hub 130, the spool 132, the support plate 140, the casters 145, and the rails 150, 152 of FIGS. 1-3.

Instead of, or in addition to, the handle 142 in the example of FIGS. 1-3, the example implementation of FIG. 8 includes a handle 802, which is attached to the support base 108 via brackets 804 or other fastening or attachment methods. The handle 802 may be a harness, rope, chain, U-shaped bar, T-shaped or other type of handle, and/or any other devices to allow pulling of the system 100 using the reduced friction of the rails 150, 152. The example of FIG. 8 may include or omit the casters 145.

Figure 9:
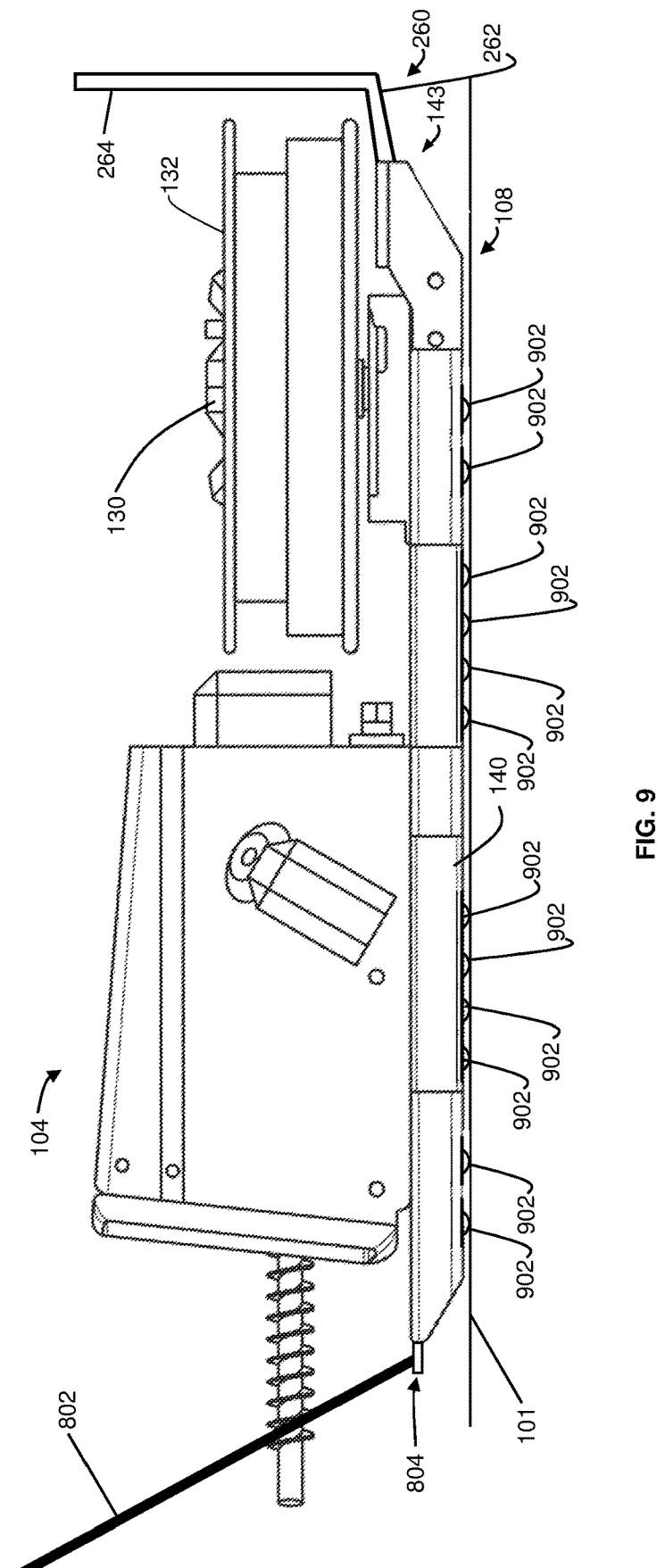
FIG. 9 is a side view of another example welding system in a horizontal operational position.

FIG. 9 is a side view of another example welding system 900 in a horizontal position. The example welding system 900 includes the drive assembly 104, the support base 108, the hub 130, the spool 132, the support plate 140, and the casters 145, of FIGS. 1-3. The example welding system 900 also includes the handle 802 and brackets 804 attached to the support base 108 of FIG. 8.

In contrast with the example rails 150, 152 of FIG. 8, the example welding system 900 includes rollers 902 to reduce the sliding friction involved with pulling the welding system 900. The rollers 902 may be implemented using ball bearings, pin bearings, wheels, casters, and/or any other type of friction-reducing element. The rollers 902 may be distributed over the bottom of the support base 108 in any desired manner, such as in rows near the sides of the support base 108, in the center of the support base 108, and/or arranged and distributed based on the expected weight distribution over the top of the support base 108.

The example rollers 902 of FIG. 9 are at least partially inset into the support base 902 to reduce the profile of the support base 108 and the welding system 900 relative to conventional welding carts.

The rails 150, 152 of FIG. 8 and the rollers 902 of FIG. 9 are examples of friction-reducing devices or surfaces which extend from the bottom of the support base 108 (e.g., instead of extending to the side of the support base 108) to reduce friction when moving the welding systems. In contrast with the wheels used on conventional welding carts, the example welding systems using friction-reducing devices may be more easily maneuvered due to a reduction in movement constraints (e.g., due to use of wheels which have a single rotational axis) and/or a reduced profile.

Similar to the examples of FIGS. 1-7, the hub 130 and the spool 132 in the examples of FIGS. 8 and 9 may have a different orientation with respect to the plate 140, and/or the orientation and/or position of the hub 130 and the spool 132 may be adjustable.

The examples of FIGS. 8 and 9 each further include the support stand 260, including the extension bracket 262 and the support member 264.

Figure 10:
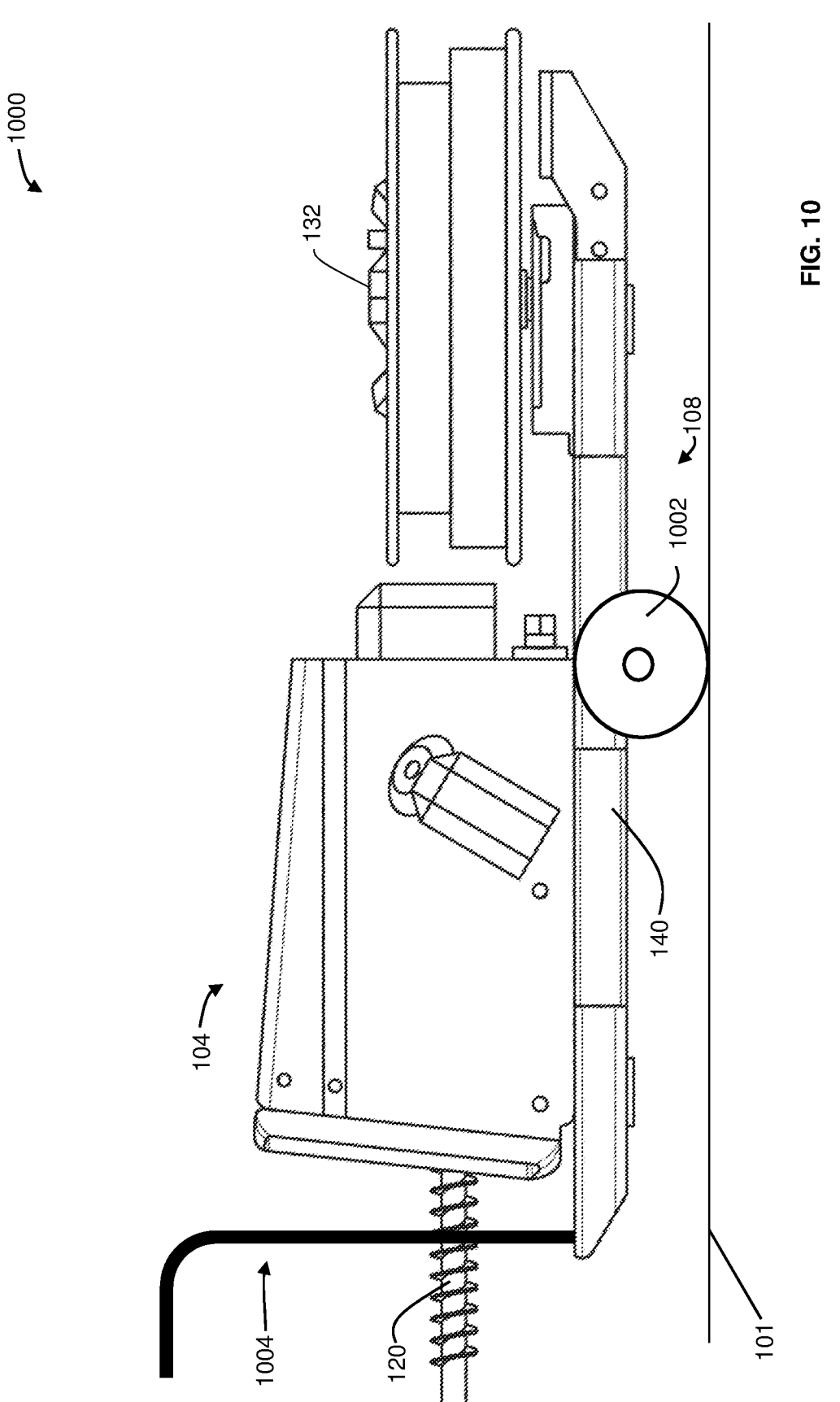
FIG. 10 is a side view of another example welding system having wheels positioned between the ends of the support base, shown in a horizontal travel position, in accordance with aspects of this disclosure.
Figure 11:
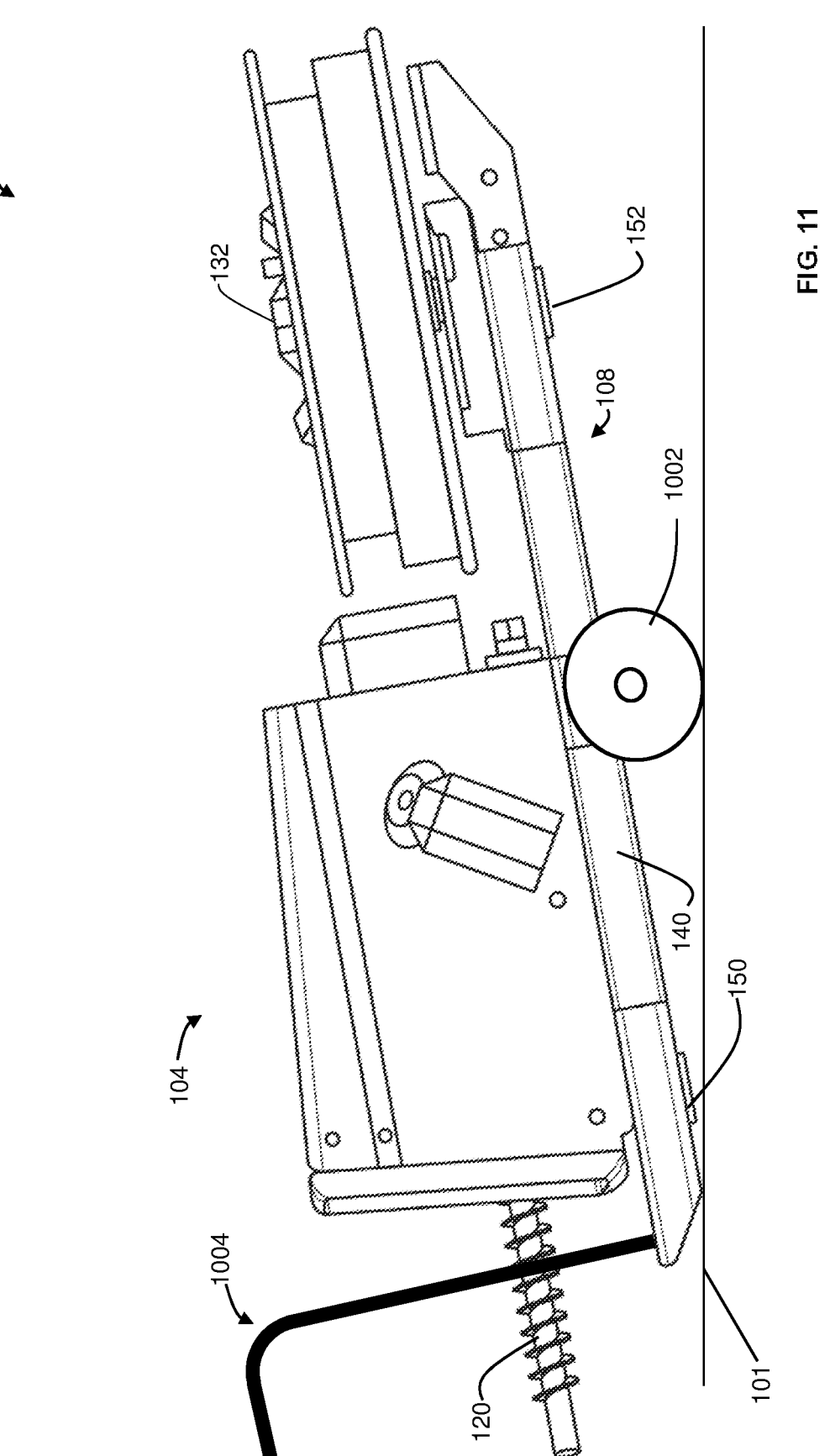
FIG. 11 is a side view of the example welding system of FIG. 10 in an angled operational position.

FIG. 10 is a side view of another example welding system 1000 having wheels 1002 positioned between the ends of the support base 108. FIG. 11 is a side view of the example welding system 1000 of FIG. 10 in an angled operational position. The example welding system 1000 includes the drive assembly 104, the support base 108, the hub 130, the spool 132, and the support plate 140 of FIGS. 1-3. The wheels 1002 of FIG. 10 are rotationally coupled to the support base 108 via one or more axles, brackets, and/or any other wheel attachment techniques.

Because the wheels 1002 of FIGS. 10 and 11 include a single set of wheels which are set between the ends (e.g., in the middle) of the support base 108, the operational position in the welding system 1000 is an angled position instead of a horizontal position. Contact between the support base 108 and the support surface 101 in the angled operational position provides a braking effect which resists movement by the welding system 1000. Conversely, the travel position is a substantially horizontal position, in which the support base 108 is out of contact with the support surface 108, and the welding system 1000 is able to move more freely via the wheels 1002.

Because the travel position is more horizontal than the examples of FIGS. 1-7, to improve the ergonomics of the example welding system 1000 a handle 1004 may extend from the support base 108 to a more easily reachable position. The size and specific position of the wheels 1002 along the support base 108 may determine the range of angles of the travel position (e.g., the range of angles at which the support base 108 does not contact the support surface 101).

The present disclosure has been described in terms of preferred embodiments, and it is recognized that equivalents, alternatives, and modifications, aside from those expressly stated, are possible and within the scope of the appending claims. The foregoing description and accompanying figures illustrate the principles, preferred embodiments, and modes of operation. However, the disclosure should not be construed as being limited to the particular embodiments discussed above. Additional variations of the embodiments discussed above will be appreciated by those skilled in the art. As stated above, the present disclosure is also applicable with non-MIG welding systems such as TIG and stick welders. Any desired welding system, power supplies, welding components, or other mechanical systems and components (including non-welding related systems) may be positioned on a support structure as described herein.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A wire feeder, comprising:
a wire supply support configured to supply welding wire;
a wire drive assembly configured to feed wire to a welding gun from the wire supply support;
a support plate defining a lower surface, the wire supply support and the wire drive assembly mounted to the support plate, the support plate being pivotable from an operational position to a travel position;
a handle at a first end of the support plate; and
at least one reduced friction element extending from a second end of the support plate so that the support plate is in contact with a support surface when the support plate is in the operational position, and the reduced friction element is in engagement with the support surface and the support plate is out of contact with the support surface when the support plate is pivoted to the travel position,
wherein the support plate is pivotable from the operational position to plural travel positions including a first angled position in which the reduced friction element and the lower surface of the support plate are in engagement with the support surface, and a second angled position in which the reduced friction element is in engagement with the support surface and the lower surface of the support plate is out of engagement with the support surface.

2. The wire feeder of claim 1, wherein the at least one reduced friction element comprises at least one caster, the wire feeder further comprising a caster support bracket extending from the support plate that spaces the at least one caster from the lower surface of the support plate.

3. The wire feeder of claim 1, wherein the at least one reduced friction element comprises at least two casters extending from the second end of the support plate and spaced from the lower surface of the support plate so that the casters are out of engagement with the support surface when the support plate is in the operational position and the casters are in engagement with the support surface when the support plate is pivoted to the travel position.

4. The wire feeder of claim 1, further comprising a support stand extending from the second end of the support plate.

5. The wire feeder of claim 4, wherein:
the support plate is pivotable to a stored position; and
the support stand is configured to support the wire feeder in the stored position.

6. The wire feeder of claim 5, wherein the reduced friction element is out of engagement with the support surface when the wire feeder is pivoted to the stored position.

7. The wire feeder of claim 4, wherein the support stand comprises a plate.

8. The wire feeder of claim 4, wherein the stored position is an upright position.

9. The wire feeder of claim 1, further comprising at least one rail extending from the bottom of the support plate, the at least one rail defining the lower surface of the support plate and configured to support the wire feeder when the support plate is in the operational position.

10. The wire feeder of claim 1, wherein the at least one reduced friction element is out of engagement with the support surface when the support plate is in the operational position.

11. A sled for a wire feeder, the wire feeder including a wire supply support configured to supply welding wire and a drive assembly configured to feed wire to a welding gun from the wire supply support, the sled comprising:
a support plate defining a lower surface and configured to mount the wire supply support and the wire drive assembly to the support plate, the support plate being pivotable from a horizontal operational position to an angled travel position; and
at least one reduced friction element extending from a second end of the support plate so that the support plate is in contact with a support surface when the support plate is in an operational position, and the reduced friction element is in engagement with the support surface and the support plate is out of contact with the support surface when the support plate is pivoted to the travel position,
wherein the support plate is pivotable from the operational position to plural travel positions including a first angled position in which the reduced friction element and the lower surface of the support plate are in engagement with the support surface, and a second angled position in which the reduced friction element is in engagement with the support surface and the lower surface of the support plate is out of engagement with the support surface.

12. The sled of claim 11, further comprising a support bracket extending from the support plate that spaces the reduced friction element from the lower surface of the support plate.

13. The sled of claim 11, wherein the at least one reduced friction element comprises at least two casters extending from the second end of the support plate and spaced from the lower surface of the support plate so that the casters are out of engagement with the support surface when the support plate is in the operational position and the casters are in engagement with the support surface when the support plate is pivoted to the travel position.

14. The sled of claim 11, further comprising a support stand extending from the second end of the support plate.

15. The sled of claim 14, wherein:

the support plate is pivotable to an upright storage position; and the support stand extends from the support plate and is configured to support the wire feeder in the upright storage position.

16. The sled of claim 11, wherein the reduced friction element comprises a caster.

17. The sled of claim 11, wherein a first end of the support plate has a handle comprising one or more openings, the first end of the support plate on an opposite end of the support plate from the second end.

18. The sled of claim 17, wherein the wire drive assembly is mounted to the support plate closer to the first end than the second end, and the wire supply support is mounted to the support plate closer to the second end than the first end.

19. A wire feeder, comprising:

a wire supply support configured to supply welding wire;

a wire drive assembly configured to feed wire to a welding gun from the wire supply support;

a support plate defining a lower surface, the wire supply support and the wire drive assembly mounted to the support plate, the support plate being pivotable from an operational position to a travel position; and at least one reduced friction element coupled to the support plate, so that the support plate is in contact with a support surface when the support plate is in the operational position, and the reduced friction element is in engagement with the support surface and the support plate is out of contact with the support surface when the support plate is pivoted to the travel position, wherein the support plate is pivotable from the operational position to plural travel positions including a first angled position in which the reduced friction element and the lower surface of the support plate are in engagement with the support surface, and a second angled position in which the reduced friction element is in engagement with the support surface and the lower surface of the support plate is out of engagement with the support surface.

\* \* \* \* \*